United States Patent [19]

Bräutigam

[11] 4,386,504

[45] Jun. 7, 1983

[54] APPARATUS FOR THE LONG-TERM STORAGE OF BIOLOGICAL MATERIAL

[75] Inventor: Max Bräutigam, Seeon, Fed. Rep. of Germany

[73] Assignee: Linde Aktiengesellschaft, Wiesbaden, Germany

[21] Appl. No.: 295,483

[22] Filed: Aug. 24, 1981

[30] Foreign Application Priority Data

Aug. 26, 1980 [DE] Fed. Rep. of Germany ....... 3032088

[51] Int. Cl.³ ............................................ F25D 25/04
[52] U.S. Cl. .......................................... 62/380; 62/78; 198/952
[58] Field of Search ....................... 62/63, 64, 78, 380, 62/381; 198/952; 34/109

[56] References Cited

U.S. PATENT DOCUMENTS

| | | | |
|---|---|---|---|
| 2,077,608 | 4/1937 | Wood | 62/63 |
| 2,584,628 | 2/1952 | Skillman | 62/380 |
| 3,787,699 | 1/1974 | Menachem et al. | 62/381 |
| 3,797,272 | 3/1974 | Huey | 62/381 |
| 4,064,707 | 12/1977 | Connizzoli et al. | 62/381 |

FOREIGN PATENT DOCUMENTS 1170433  1/1962  Fed. Rep. of Germany .

Primary Examiner—Ronald C. Capossela
Attorney, Agent, or Firm—Karl F. Ross; Herbert Dubno

[57] ABSTRACT

A method of and an apparatus for the storage of biological materials at low temperature provides the biological material in containers (biotainers) which are displaced in a vessel subject to low temperature cooling along a closed path. The movement of the biotainers along this closed path has been found to reduce deterioration and increase the storage life thereof. The system is principally effective for the storage of blood.

4 Claims, 5 Drawing Figures

APPARATUS FOR THE LONG-TERM STORAGE OF BIOLOGICAL MATERIAL

FIELD OF THE INVENTION

My present invention relates to a method of and to an apparatus for the long-term storage of biological materials and, more particularly, to the storage of frozen biological substances at temperatures below about 200° K. in closed cooled vessels. It is especially applicable to the storage of blood.

BACKGROUND OF THE INVENTION

The conservation of biological substances must avoid irreversible cell deterioration which can occur as a result of mechanical or physical action, chemical phenomena and the like. One of the principal approaches to the long-term storage of biological substances, e.g. blood, has been the deep-freezing thereof.

The biological substance, e.g. the blood, can be admixed with a preservative or other protective additive which prevents, during the deep-freezing process, any damage to the cell membrane or hemolysis of the red blood cells of the material.

The blood, admixed with the additive, is then introduced into a container and is agitated in a deep-cooling medium such as liquid nitrogen to freeze the blood which can then be stored for relatively long periods at temperatures below about 200° K.

Notwithstanding the fact that the deep-freezing of blood and the storage of deep-frozen blood at low temperatures has considerably advanced the art of blood storage, the storage time is not unlimited and blood banks or like storage facilities must reckon with a considerable percentage of deterioration of the stored product.

OBJECTS OF THE INVENTION

It is the principal object of the present invention to provide an improved method of storing biological materials at low temperatures whereby disadvantages of earlier techniques are obviated and, especially, the length of time for which the product can be stored is increased significantly.

Another object of the invention is to provide a process for the storage of deep-frozen biological materials, especially blood, which markedly reduces deterioration in the stored products and nevertheless facilitates access to the stored product enabling the same to be readily retrieved from storage.

It is also an object of this invention to provide an improved apparatus for the long-term storage of biological substances, especially blood.

SUMMARY OF THE INVENTION

These objects and others which will become apparent hereinafter are attained in accordance with the present invention by a method which is based upon my surprising discovery that deep-frozen biological substances can be stored for far greater periods of time than has hitherto been the case if the container for the biological substances (biotainer) is stored in a vessel maintained at temperatures below about 200° K. and is displaced along a closed path in this container substantially continuously, i.e. between incidents of insertion or removal of the biotainer into and out of the cooled vessel.

While I am not able to fully explain why this cyclical movement of the biotainer within the cooled vessel results in a significant improvement of the storage life of the biological materials by comparison with biological materials stored in an otherwise identical vessel and at the same temperature but in a quiescent state, apparently the movement of the biotainer along the closed path through the cooling vessel results in an equalization of the temperature to which the material is subject and thus prevents convective or other phenomena from resulting in even brief periods during which the biological substance may be subject to temperature fluctuations detrimental to the stability of these substances.

The method has been found to provide a practically unlimited storage time for biological substances and especially blood which is of particular importance since it eliminates the need for discarding blood and allows, for example, the storage of a particular donor's blood for long periods in an intact state until the donor may require his own blood.

Up to now, because of the difficulties in preserving blood for long periods, it has not been practical for a particular individual to contribute blood over a long span of good health and be certain that he will be able to obtain transfusions of his own blood at a later date. This is of special significance where the blood of the donor may be of an unusual type or may have antibodies or characteristics which may not be available from the blood of another donor should a transfusion be required.

An apparatus for carrying out the method of the invention can thus comprise a deep-cooled vessel which can be subject to direct or indirect cooling by liquid nitrogen, and a conveyor within this vessel adapted to receive a large number of biotainers for displacing them along a closed path.

According to a feature of the invention, the conveyor is provided with a positive drive so that each position on the container has a predetermined relationship to the drive input enabling such locations to be selectively positioned at a gate or lock at which the biotainers are inserted or removed. This greatly facilitates access to a particular biotainer when the need arises.

Since several thousand biotainers can be stored in a vessel, the rapid recovery of a particular biotainer, e.g. for a specific donor, can be assured by providing, according to another feature of the invention, the positions of the biotainers in a data bank which can be accessed to automatically or through the intermediary of an operator positioned at the selected location at the gate.

For example, the data bank may be a conventional computer provided with an input terminal for recording the location and any necessary additional data for a particular specimen and can read out this data upon command, while the storage apparatus can have a pulse motor or other controlled drive having an input which can include a keyboard or the like for selecting the particular location to be positioned at the gate. Alternatively, the computer can be automatically coupled to the drive to access the particular location.

The additional data which can be recorded, apart from the position of the biotainer upon the conveyor, can include the date at which the biological specimen was taken and/or stored, biological characteristics of the deep-frozen substance and, in the case of assignment of the stored material to a particular individual, the name of the donor.

The positioning of the biotainer on the conveyor is facilitated by the use of a grid pattern.

To maintain the deep-cooling temperature, the vessel is cooled by a low-boiling liquefied gas, preferably liquefied nitrogen. Thus, for example, a temperature sensor within the vessel can control an inlet valve for the coolant which enables the coolant to be directly sprayed into the vessel (direct cooling), or to pass through a cooling coil within the vessel (indirect cooling) or to pass through such a coil and then expand into the vessel in a combination of indirect and direct cooling.

Within the vessel itself such cooling appears to result in a homogeneous temperature distribution because of convective action in combination with the displacement of fluid resulting from the movement of the biotainers on the conveyor. For biological specimens the usual storage temperature is between −130° C. and −190° C. and for blood is preferably about −140° C.

According to the invention, the cooling vessel is provided with a motor disposed outwardly of the vessel wall for driving the conveyor which can have holders for the biotainers. At an upper portion of this vessel, a gate is provided which can have the shape of the container cross section and is preferably a slot since the best results are obtained with flat biotainers. When indirect cooling is used in whole or in part, the cooling coils are preferably provided at the upper portion of the vessel and, in all cases, best results are obtained when the biotainer has the shape of the holder.

In a particularly advantageous embodiment of the invention, the vessel is a horizontally elongated cylindrical tank and the means for displacing the biotainers along the closed path is preferably a conveyor which itself can be rotated about an axis coaxial with the vessel. The conveyor can be driven by a shaft extending perpendicular to the axis of the vessel when this shaft is in a vertical position and the holders for the biotainers can be rigid members which are of a shape corresponding to that of the biotainers.

According to a further feature of the invention, the biotainers have a rectangular or square configuration and are inserted into the vessel through a slit at the top of the vessel and formed in a warm-air passage through which the shaft for the conveyor extends. The conveyor itself may be formed by two opposite synchronously driven endless elements connected by transverse members, the elements being chains, belts or the like. The transverse elements, which are spaced apart, can form hangers for the biotainers or can be provided with platforms supporting them. Spacers can be provided between the biotainers on these members.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
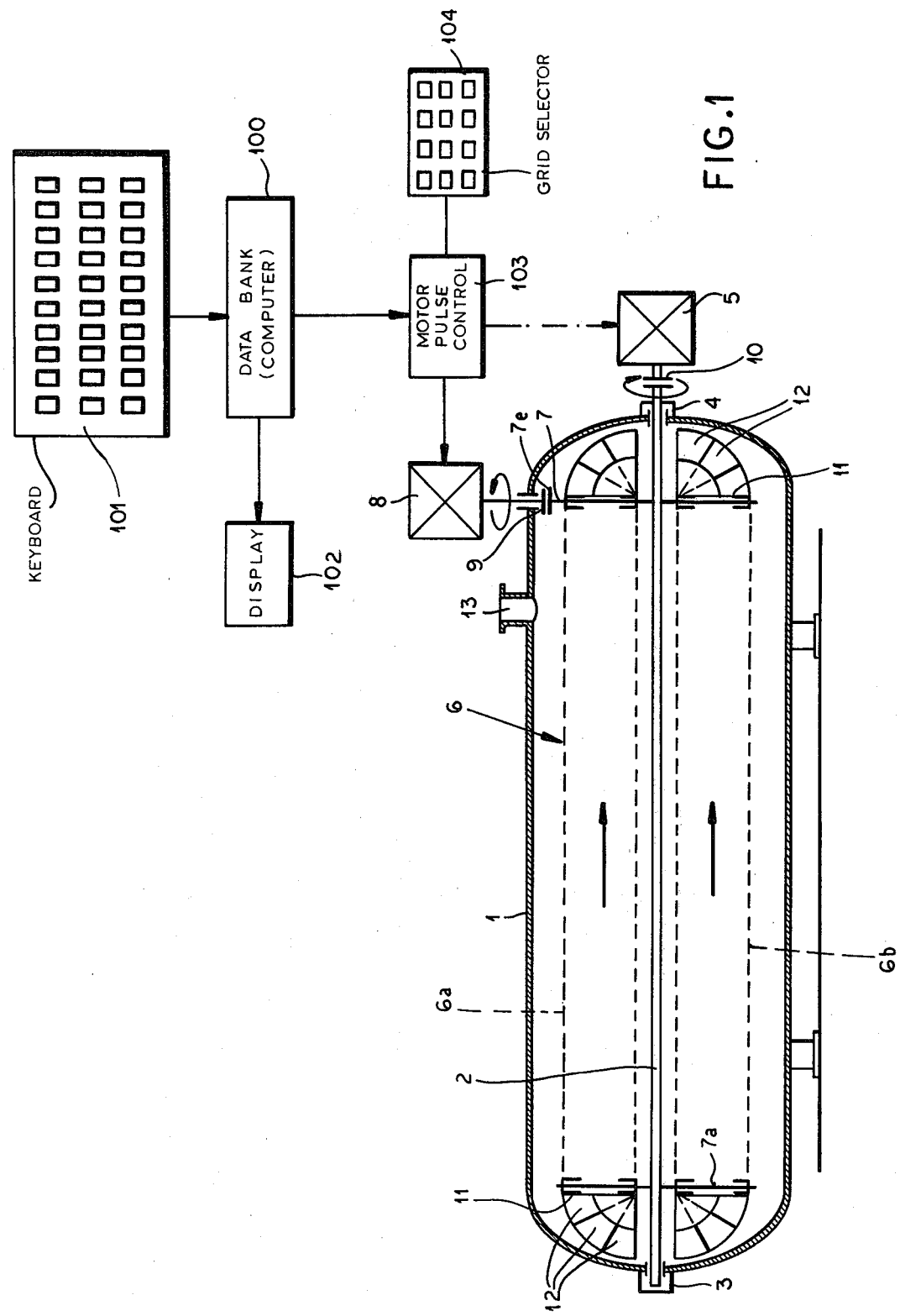
FIG. 1 is a diagrammatic axial section through a vessel according to the invention.

FIG. 1 shows a cooled-storage vessel 1 in the form of a tank which is horizontally elongated, cylindrical and formed with outwardly convex domed ends.

A drive shaft 2 lies along the horizontal axis of this vessel and is journaled at 3 and 4 at the two ends thereof where the shaft passes out of the vessel.

A drive including a motor, stepdown transmission and a clutch 10 is mounted at the bearing 4 which can also be provided as an expansion and contraction joint enabling variations in the dimensions of the tank and the shaft with temperature to be compensated.

Figure 1A:
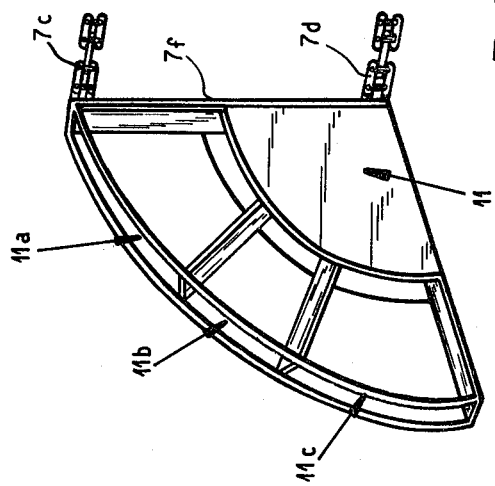
FIG. 1A is a diagrammatic perspective view of a holder for use in such a vessel.

The drive shaft 2 carries a means represented at 6 for the displacement of biotainers 12 along closed paths, this means comprising a pair of conveyors 6a and 6b which pass around the shafts 7 and 7a mounted radially on the shaft 2. The shaft 7 can carry sprocket wheels which can engage chains 7c and 7d forming the conveyors (FIG. 1A) and ensuring a positive or form-locked connection between a drive motor 8 and the chains.

The shaft 7 is formed with a fitting 7e engageable by a coupling 9 when the latter is moved radially inwardly at its location at the top of the vessel so that in the vertical position of shaft 7, the latter can be rotated by the drive motor 8 which is disposed outside the vessel.

The conveyors 6a and 6b are formed by individual rigid members 7f corresponding to the rigid members of an escalator, each of which carries a holder 11 having the form of one quadrant of a circle and conforming to the cross section of the vessel. So that each holder 11 will have sufficient stiffness, it is designed to provide compartments 11a, 11b and 11c for respective biotainers 12 of corresponding shapes. For the greatest long-term storage capacity, it has been found to be advantageous to form the biotainers as flat members with a thickness of say 8 mm and as circular sectors. The biotainers can thus be stacked closely together so that a number of them will form a quadrant of a circle.

The insertion and removal of the biotainers is effected through a slit-shaped gate 13 close to the drive 8 and when the biotainers are in their uppermost positions and the respective holders aligned with the gate. The slit advantageously runs transverse to the vessel axis.

All of the drives, i.e. the motor 5 for the shaft 2 and the drive 8 for the conveyors 6a and 6b are form-locked so precise positioning of the biotainers is assured and the biotainers can be laid out in a grid pattern so that locations can be stored in a data bank. More particularly, the apparatus is associated with a data bank or computer 100 having an input terminal formed by a keyboard 101 and associated with a display 102. In addition, the motor 8 is controlled by a digital or pulse controller 103 which can be operated by the computer 100 or through a selector keyboard 104.

For introduction of a biotainer, the drive 8 is operated by the controller 104, 103 to position a vacant holder 11 at the gate 13 and the biotainer is inserted. The location and data regarding the storage date, biological characteristics and even the name of the donor can be recorded in association with this location by the keyboard 101 in the data bank.

Thereafter, the conveyors 6a and 6b are set in motion and/or the shaft 2 is rotated, the shaft 7 having been decoupled at 9 from the motor 8.

When next insertion or removal is required, shaft 2 is rotated to bring conveyors 6a or 6b into proper position as controlled by the grid selector 104 or the keyboard 101, and shaft 7 recoupled to the motor 8 which then drives the conveyor to align the appropriate holder 11 with the gate 13.

Figure 2:
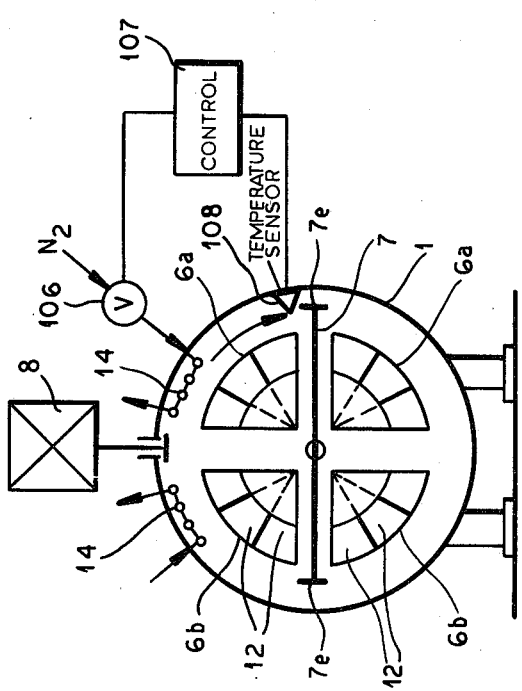
FIG. 2 is a diagrammatic transverse section through the vessel of FIG. 1.

FIG. 2 shows that cooling coils 14 can be provided at the upper part of the vessel, these coils being fed with liquid nitrogen, through valves such as that represented at 106, preferably operated by a temperature controller 107 receiving an input from a temperature sensor 108 within the tank. The liquid nitrogen can also be introduced directly into the tank in which case nitrogen gas can escape from the gate. The biotainers are secured to the holders so that they remain upright when the conveyor passes over its shafts.

Figure 3:
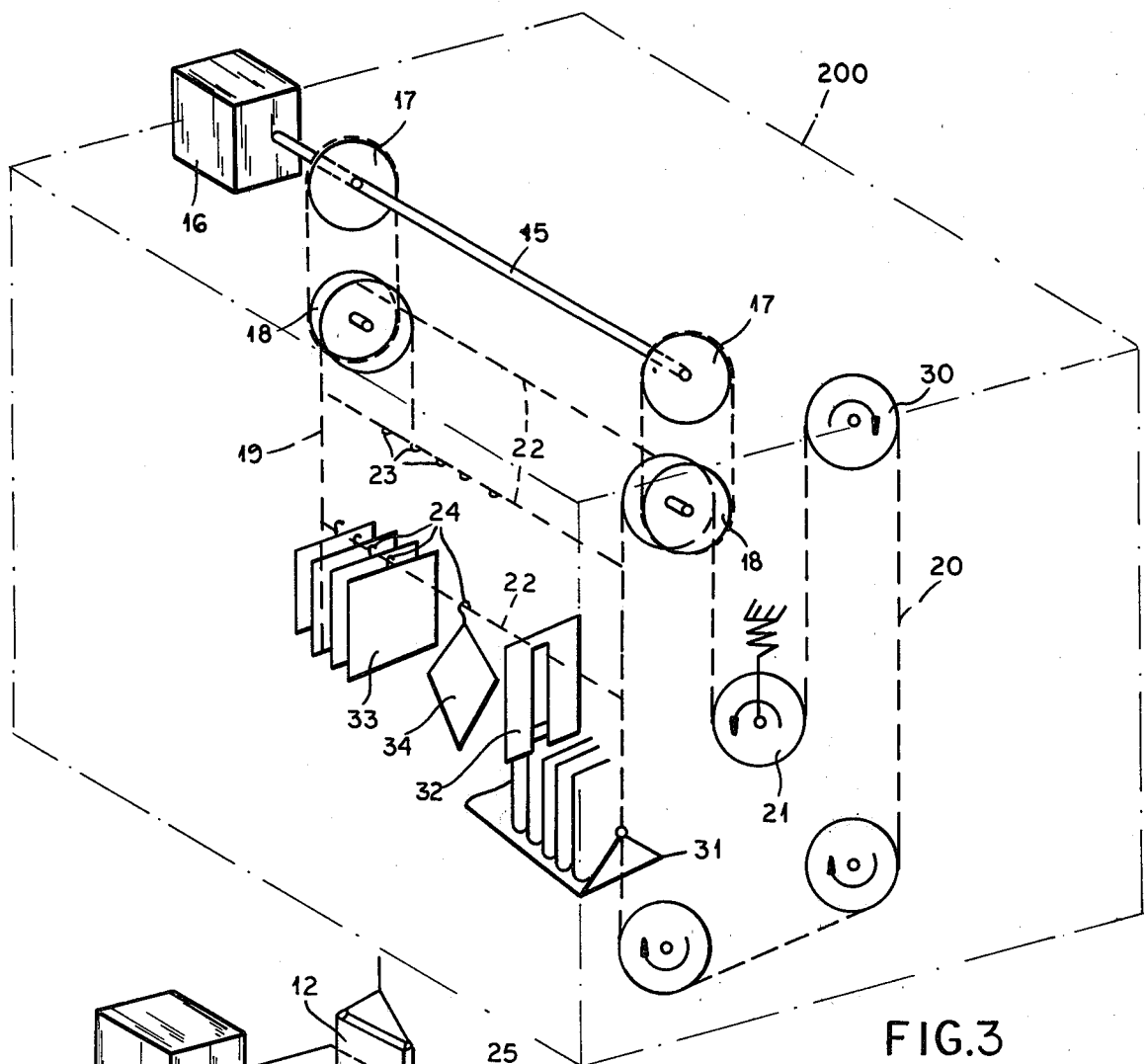
FIG. 3 is a schematic perspective view illustrating another embodiment of the invention.
Figure 4:
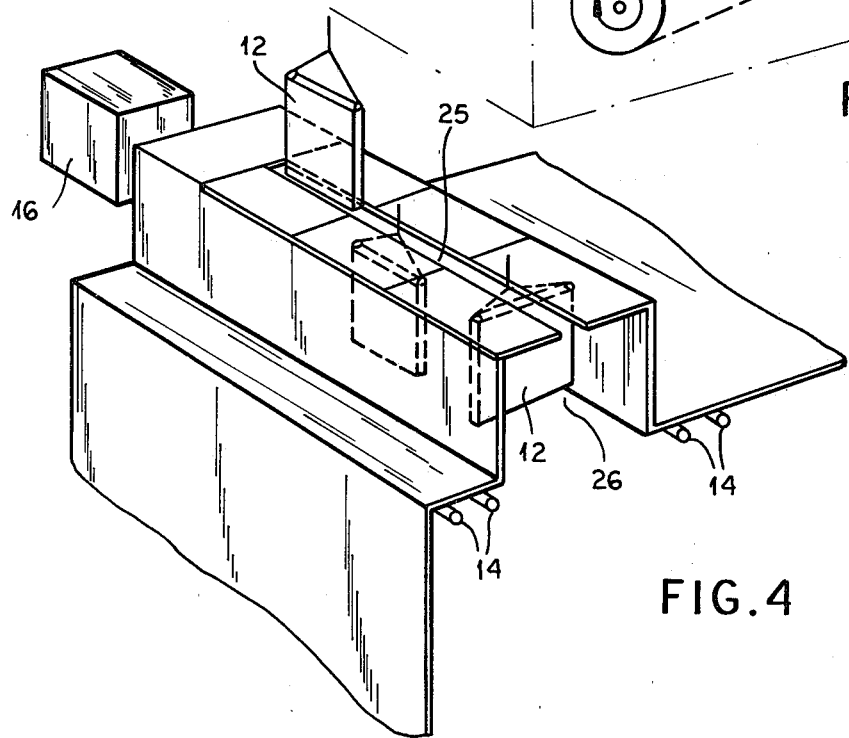
FIG. 4 is a fragmentary perspective view of the vessel used with the system of FIG. 3.

FIG. 3 shows an apparatus for displacing the biotainers along a closed path and can comprise a cubical vessel represented in dot-dash lines at 200 in this FIGURE.

A shaft 15 driven by a motor 16 outside this vessel, drives synchronously a pair of sprockets 17 and by respective chains, sprockets 18 which can be rotatable on shafts affixed to opposite sides of the vessel. The sprockets 18 are coupled with other sprockets driving endless conveyor elements 19 and 20, these elements passing over idler wheels 30 and being mounted taut by spring-loaded wheels 21. The elements 19 and 20 can be chains, bands, belts or the like.

Elements 19 and 20, which are thus synchronously driven, are spanned by transverse members 22 which can be chains, bars, boards, trays or platforms. The transverse elements 22 are provided with indexing lugs 23 engageable with hooks 24, eyes or other elements for hanging the biotainers on the transverse members 22. Each biotainer position, therefore, can be readily recorded in the data bank in the manner previously described.

The biotainers may also be carried on platforms as shown at 31, can be slotted as represented at 32 to straddle the respective member 22 and can have the hooks 24 centrally of an upper edge as shown at 33, or at a corner (see biotainer 34).

For introduction of the biotainers, a slit-shaped gate 25 is provided at the top of the vessel 200, the gate and the shaft 15 being advantageously located in a warm-air passage 26 which can be provided with additional means for shielding the system from escape of cold. This cold insulation can be removed temporarily during introduction and withdrawal of biotainers.

The circulating movement of the biotainers need not be exclusively an up-and-down movement but can also be a serpentine or back-and-forth movement as may be desirable. The cooling coils 14 are here disposed below the upper wall of the tank to cool the interior thereof as well as this wall.

I claim:
1. An apparatus for the long-term storage of biological substances, comprising:
   a vessel;
   means forming a gate affording access to the interior of said vessel whereby a biotainer in the form of a flat circular sector containing a deep-frozen biological substance can be inserted into said vessel;
   cooling means in said vessel for maintaining the temperature of biotainers therein below about 200° K.; and
   a chain conveyor in said vessel for at least intermittently displacing said biotainers along a closed path, said gate having a shape corresponding to the cross section of said biotainers and said conveyor being formed with holders for receiving said biotainers, said holders conforming to the shape of said biotainers, said holders sequentially halting in registry with said gate.

2. The apparatus defined in claim 1 wherein said vessel is a horizontally elongated tank having a horizontal axis, a shaft extending along said axis, said conveyor being carried by said shaft and means connectable with said conveyor for driving said conveyor on said shaft.

3. The apparatus defined in claim 2 wherein said conveyor comprises a plurality of rigid members, each of said members being formed with a respective holder for at least one biotainer.

4. The apparatus defined in claim 1, further comprising a data bank receiving information representing the location of each biotainer along said path, said conveyor being formed with means responsive to said data for selectively positioning a biotainer at said gate.

* * * * *